US011237812B2

(12) United States Patent
Li et al.

(10) Patent No.: US 11,237,812 B2
(45) Date of Patent: *Feb. 1, 2022

(54) DEPLOYING AN APPLICATION IN A CLOUD COMPUTING ENVIRONMENT

(71) Applicant: International Business Machines Corporation, Armonk, NY (US)

(72) Inventors: Tong Li, Beijing (CN); Xin Sheng Mao, Beijing (CN); Jia Tan, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,699

(22) Filed: Nov. 25, 2019

(65) Prior Publication Data

US 2020/0089483 A1 Mar. 19, 2020

Related U.S. Application Data

(63) Continuation of application No. 15/140,102, filed on Apr. 27, 2016, now Pat. No. 10,528,333, which is a (Continued)

(30) Foreign Application Priority Data

Jun. 26, 2013 (CN) .......................... 201310259539.4

(51) Int. Cl.
*G06F 9/44* (2018.01)
*G06F 8/61* (2018.01)
(Continued)

(52) U.S. Cl.
CPC .................. *G06F 8/61* (2013.01); *G06F 8/60* (2013.01); *G06F 8/63* (2013.01); *G06F 8/65* (2013.01);
(Continued)

(58) Field of Classification Search
None
See application file for complete search history.

(56) References Cited

U.S. PATENT DOCUMENTS 7,624,449 B1 * 11/2009 Perriot .................. G06F 21/563
726/22
7,975,266 B2 7/2011 Schneider et al.
(Continued)

FOREIGN PATENT DOCUMENTS

CN 102763085 B 8/2016
CN 104253831 B 5/2018

OTHER PUBLICATIONS

Zhou, Jiehan, et al.; Cloud Architecture for Dynamic Service Composition; International Journal of Grid and High Performance Computing; Apr.-Jul. 2012.
(Continued)

*Primary Examiner* — Anna C Deng
(74) *Attorney, Agent, or Firm* — Michael O'Keefe

(57) ABSTRACT

A technique for deploying an application in a cloud computing environment includes collecting, when a user is deploying an application, metadata and instructions on deploying the application. The metadata includes service metadata, application metadata and topology metadata, where the service metadata includes metadata on a service required for deploying the application, the application metadata includes metadata on the application, and the topology metadata includes metadata indicative of a relationship between the service and the application. The collected metadata and instructions are stored as a model for re-deploying the application.

17 Claims, 6 Drawing Sheets

US 11,237,812 B2

Page 2

Related U.S. Application Data continuation of application No. 14/498,725, filed on Sep. 26, 2014, now Pat. No. 9,354,851, which is a continuation of application No. 14/263,841, filed on Apr. 28, 2014, now Pat. No. 9,361,081.

(51) Int. Cl.
*G06F 8/60* (2018.01)
*G06F 8/65* (2018.01)
*G06F 8/70* (2018.01)
*H04L 29/08* (2006.01)

(52) U.S. Cl.
CPC ............... *G06F 8/70* (2013.01); *H04L 67/10* (2013.01); *G06F 8/64* (2013.01); *H04L 67/1097* (2013.01)

(56) References Cited

U.S. PATENT DOCUMENTS

| | | | |
|---|---|---|---|
| 8,255,529 B2 | 8/2012 | Ferris et al. | |
| 8,347,263 B1* | 1/2013 | Offer | G06F 8/71 717/104 |
| 8,745,577 B2 | 6/2014 | Reech et al. | |
| 8,751,644 B2 | 6/2014 | Bornhoevd et al. | |
| 8,843,921 B1 | 9/2014 | Protassov et al. | |
| 9,122,687 B2 | 9/2015 | Lumens et al. | |
| 9,170,798 B2* | 10/2015 | Nagaraja | G06F 3/04842 |
| 9,244,817 B2 | 1/2016 | Cai et al. | |
| 9,251,040 B2 | 2/2016 | Cai et al. | |
| 9,336,060 B2 | 5/2016 | Nori | |
| 9,354,851 B2 | 5/2016 | Li | |
| 9,361,081 B2 | 6/2016 | Li | |
| 9,419,917 B2 | 8/2016 | Eaton | |
| 9,514,387 B2 | 12/2016 | Eaton | |
| 9,882,824 B2 | 1/2018 | Maes | |
| 9,923,952 B2 | 3/2018 | Maes | |
| 10,048,957 B2 | 8/2018 | Li | |
| 10,528,333 B2 | 1/2020 | Li | |
| 10,649,751 B2 | 5/2020 | Li | |
| 10,795,656 B2 | 10/2020 | Li | |
| 2006/0026589 A1 | 2/2006 | Schneider et al. | |
| 2007/0220032 A1 | 9/2007 | Kapoor et al. | |
| 2009/0158272 A1 | 6/2009 | El-Assir et al. | |
| 2009/0300641 A1 | 12/2009 | Friedman et al. | |
| 2011/0010704 A1 | 1/2011 | Jeon et al. | |
| 2011/0161952 A1 | 6/2011 | Poddar et al. | |
| 2011/0239212 A1 | 9/2011 | Wookey | |
| 2012/0066670 A1 | 3/2012 | McCarthy et al. | |
| 2012/0079450 A1 | 3/2012 | Reech et al. | |
| 2012/0123999 A1 | 5/2012 | Ashutosh et al. | |
| 2012/0131161 A1 | 5/2012 | Ferris et al. | |
| 2012/0185821 A1 | 7/2012 | Yaseen et al. | |
| 2012/0239739 A1 | 9/2012 | Manglik et al. | |
| 2012/0324069 A1 | 12/2012 | Nori et al. | |
| 2013/0232463 A1* | 9/2013 | Nagaraja | G06F 8/61 717/101 |
| 2013/0232480 A1 | 9/2013 | Winterfeldt et al. | |
| 2013/0238785 A1 | 9/2013 | Hawk et al. | |
| 2013/0254755 A1 | 9/2013 | Yousouf et al. | |
| 2013/0275958 A1 | 10/2013 | Ivanov et al. | |
| 2013/0297922 A1 | 11/2013 | Friedman | |
| 2013/0346945 A1* | 12/2013 | Yousouf | G06F 8/60 717/121 |
| 2014/0172924 A1* | 6/2014 | Lumens | G06F 16/11 707/812 |
| 2014/0282472 A1 | 9/2014 | Vinograd et al. | |
| 2014/0366004 A1 | 12/2014 | Cai et al. | |
| 2015/0007153 A1 | 1/2015 | Martinez et al. | |
| 2015/0058823 A1 | 2/2015 | Cai et al. | |
| 2015/0074278 A1 | 3/2015 | Maes et al. | |
| 2015/0100684 A1 | 4/2015 | Maes et al. | |
| 2015/0163288 A1 | 6/2015 | Maes et al. | |
| 2015/0199197 A1 | 7/2015 | Maes et al. | |

OTHER PUBLICATIONS

Chen, Zhi Xian, et al.; IBM Workload Deployer Pattern-based Application and Middleware Deployments in a Private Cloud; IBM Redbook; Mar. 22, 2012.

Ferry, Nicholas, et al.; Towards model-driven provisioning, deployment, monitoring, and adaptation of multi-cloud systems; 2013 IEEE Sixth International Conference on Cloud Computing; 2013; pp. 887-894.

Juve, Gideon, et al.; Automating Application Deployment in Infrastructure Clouds; 2011 Third IEEE International Conference on Cloud Computing Technology and Science; 2011; pp. 658-665.

Smit, Michael, et al.; A Web Service for Cloud Metadata; 2012 IEEE Eighth World Congress on Services; 2012; pp. 361-368.

Chieu, Tried, et al.; Solution-based Deployment of Complex Application Services on a Cloud; 2010 IEEE International Conference on Service Operations and Logistics and Informatics (SOLI); 2010; pp. 282-287.

Fischer, Jeffrey, et al.; Engage: A Deployment Management System; Proceedings of the 33rd ACM Sigplan Conference on Programming Language Design and Implementation; 2012; pp. 263-273.

Papaioannou, Antonis, et al.; An Architecture for Evaluating Distributed Application Deployments in Multi-Clouds; 2013 IEEE International Conference on Cloud Computing Technology and Science; 2013; pp. 547-554.

Dikaiakos, Marios D. et al.; Cloud Computing—Distributed Internet Computing for IT and Scientific Research; IEEE Internet Computing; IEEE Computer Society; vol. 13, Issue: 5, pp. 10-13; 2009.

Fan, Pei et al.; Topology-Aware Deployment of Scientific Applications in Cloud Computing; 2012 IEEE Fifth International Conference on Cloud Computing; pp. 319-326; Jun. 24-29, 2012.

Foster, Ian et al..; Cloud Computing and Grid Computing 360-Degree Compared; 2008 Grid Computing Environments Workshop; pp. 1-10; 2008.

Tsai, Wei-Tek et al.; Service-Oriented Cloud Computing Architecture; 2010 Seventh International Conference on Information Technology: New Generations; pp. 684-689; 2010.

Wickremasinghe, Bhathiya et al.; CloudAnalyst: A CloudSim-based Visual Modeller for Analysing Cloud Computing Environments and Applications; 2010 24th IEEE International Conference on Advanced Information Networking and Applications; IEEE Computer Society; pp. 446-452; 2010.

Xu, Xiwei et al.; Availability Analysis for Deployment of In-Cloud Applications; Proceedings of the 4th international ACM Sigsoft symposium on Architecting critical systems; pp. 11-16; Jun. 17-21, 2013.

Lu, Hongbin, et al.: Pattern-based Deployment Service for Next Generation Clouds; 2013 IEEE Ninth World Congress on Services; 2013; pp. 464-471.

Chinese Search Report of Chinese Application No. 201310259539. 4, dated Feb. 14, 2017, 2 pages.

Ma et al., "Using XML for Cloud Specification and XQuery for Service Discovery," iiWas 2010 Proceedings, Nov. 8-10, 2010, pp. 126-133.

\* cited by examiner

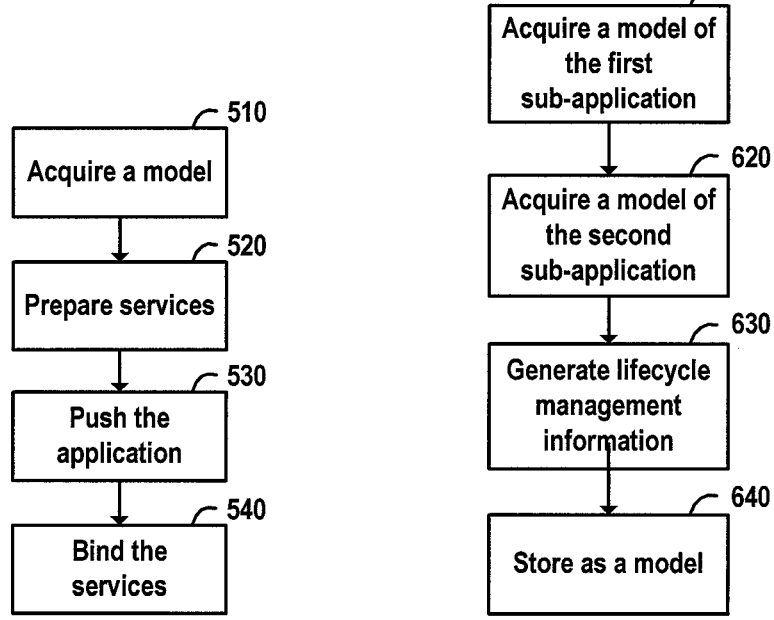
Fig. 5
Fig. 6
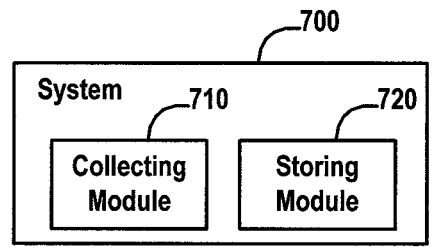
Fig. 7

DEPLOYING AN APPLICATION IN A CLOUD COMPUTING ENVIRONMENT

BACKGROUND

In a cloud computing environment, multiple users possibly need to use a certain application. For these users, currently each of them has to complete deployment of the application by himself/herself. Application deployment requires certain specialized skills. Therefore, it is rather difficult for some users to deploy an application by themselves. This limits development of the cloud platform to some extent and also brings about inconvenience to usage. Furthermore, in a cloud computing environment, if a user needs to deploy one identical application several times, he/she has to perform the same operation each time, which wastes both time and energy.

BRIEF SUMMARY

According to one aspect of the present disclosure a method and technique for deploying an application in a cloud computing environment is disclosed. The method includes collecting, when a user is deploying an application, metadata and instructions on deploying the application. The metadata includes service metadata, application metadata and topology metadata, where the service metadata includes metadata on a service required for deploying the application, the application metadata includes metadata on the application, and the topology metadata includes metadata indicative of a relationship between the service and the application. The collected metadata and instructions are stored as a model for re-deploying the application.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 5 illustrates a schematic flowchart of a method for deploying an application in a cloud computing environment according to an embodiment of the present invention;

FIG. 6 illustrates a schematic flowchart of a method for deploying a composite application in a cloud computing environment according to an embodiment of the present invention;

FIG. 7 illustrates a schematic structural diagram of a system for deploying an application in a cloud computing environment according to an embodiment of the present invention;

DETAILED DESCRIPTION

Figure 1:
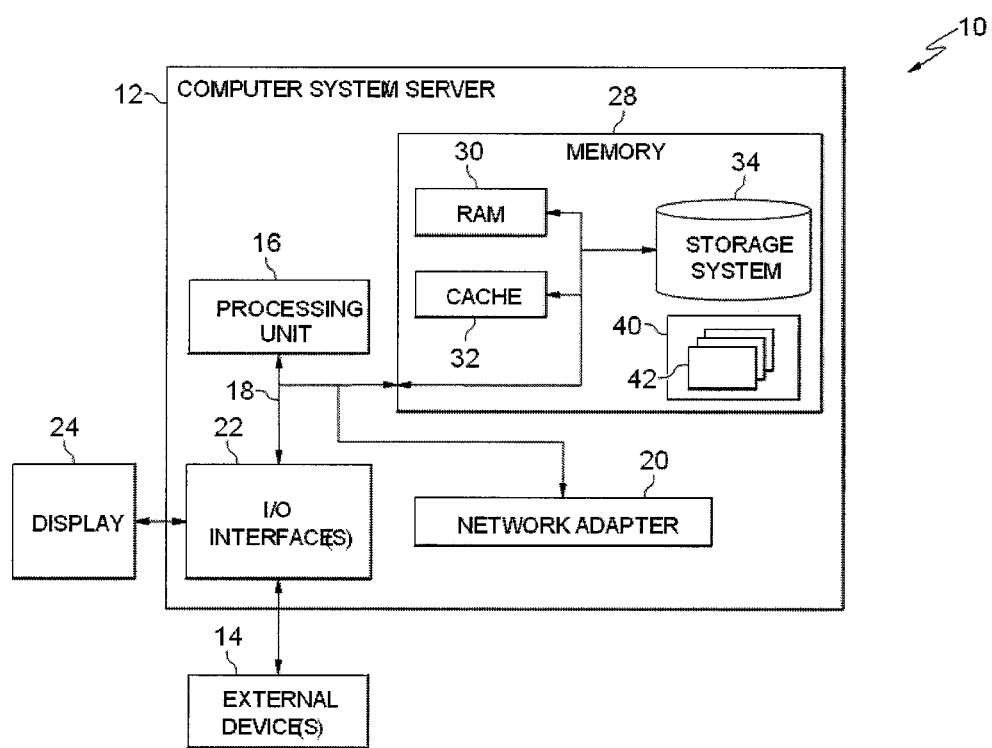
FIG. 1 illustrates a cloud computing node according to an embodiment of the present invention.

To simplify application deployment in a cloud computing environment, embodiments of the present invention provide a method, system and computer program product for deploying an application in a cloud computing environment, and further provide a method, system and computer program product for deploying a composite application in a cloud computing environment.

According to one aspect of the present invention, there is provided a method and system for deploying an application in a cloud computing environment, the method comprising: collecting, when a user is deploying an application, metadata and instructions on deploying the application, the metadata comprising service metadata, application metadata and topology metadata, wherein the service metadata comprise metadata on a service required for deploying the application, the application metadata comprise metadata on the application, and the topology metadata comprise metadata indicative of a relationship between the service and the application; and storing the collected metadata and instructions as a model for re-deploying the application.

According to another aspect of the present invention, there is provided a method for deploying an application in a cloud computing environment, the method comprising: acquiring a model obtained according to the foregoing method; preparing services used for deploying the application according to instructions and service metadata in the model; pushing the application to a running environment according to instructions and application metadata in the model; and binding the prepared services to the application according to instructions and topology metadata in the model.

According to another aspect of the present invention, there is provided a method for deploying a composite application in a cloud computing environment, the composite application at least comprising a first sub-application and a second sub-application, the method comprising: acquiring a model of the first sub-application obtained according to the foregoing method; acquiring a model of the second sub-application obtained according to the foregoing method; generating lifecycle management information of the composite application according to topology metadata in the model of the first sub-application and topology metadata in the model of the second sub-application; and storing the model of the first sub-application, the model of the second sub-application and the lifecycle management information of the composite application as a model of the composite application for deploying the composite application.

According to another aspect of the present invention, there is provided a system for deploying an application in a cloud computing environment, the system being capable of executing the foregoing methods.

The technical solution provided by the present invention can simplify deployment of applications in the cloud computing environment, lower requirements on specialized skills of application deployment, and make it convenient for users to use applications in the cloud computing environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further illustrated and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As illustrated, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
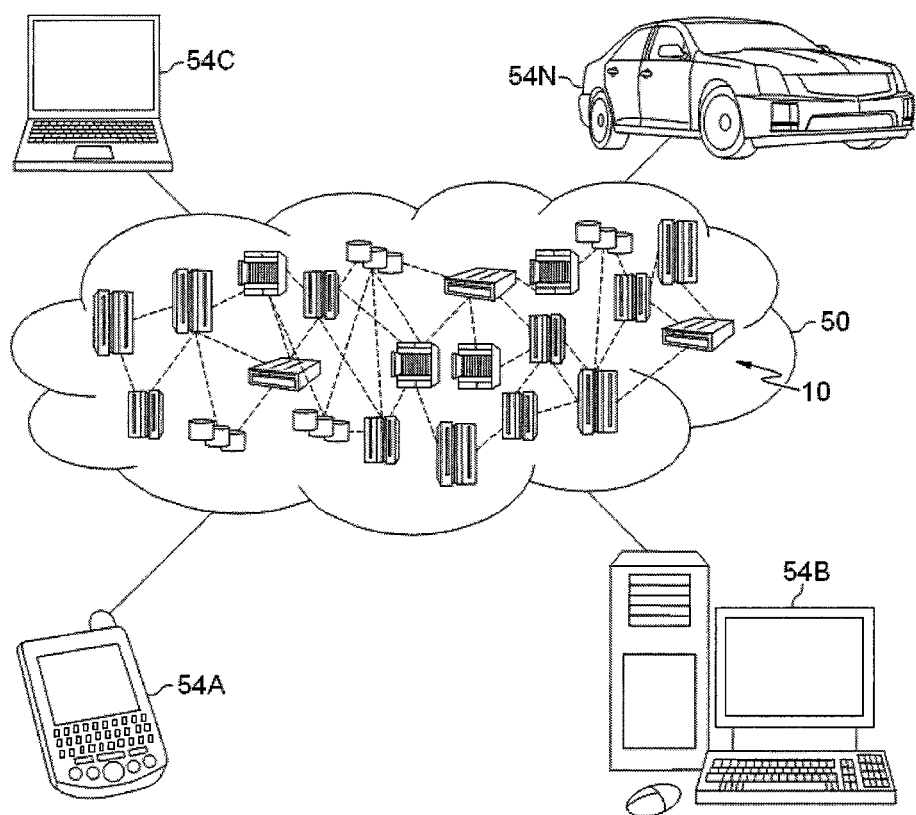
FIG. 2 illustrates a cloud computing environment according to an embodiment of the present invention.

Referring now to FIG. 2, an exemplary cloud computing environment 50 is illustrated. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds as described hereinabove, or a combination thereof. This allows the cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
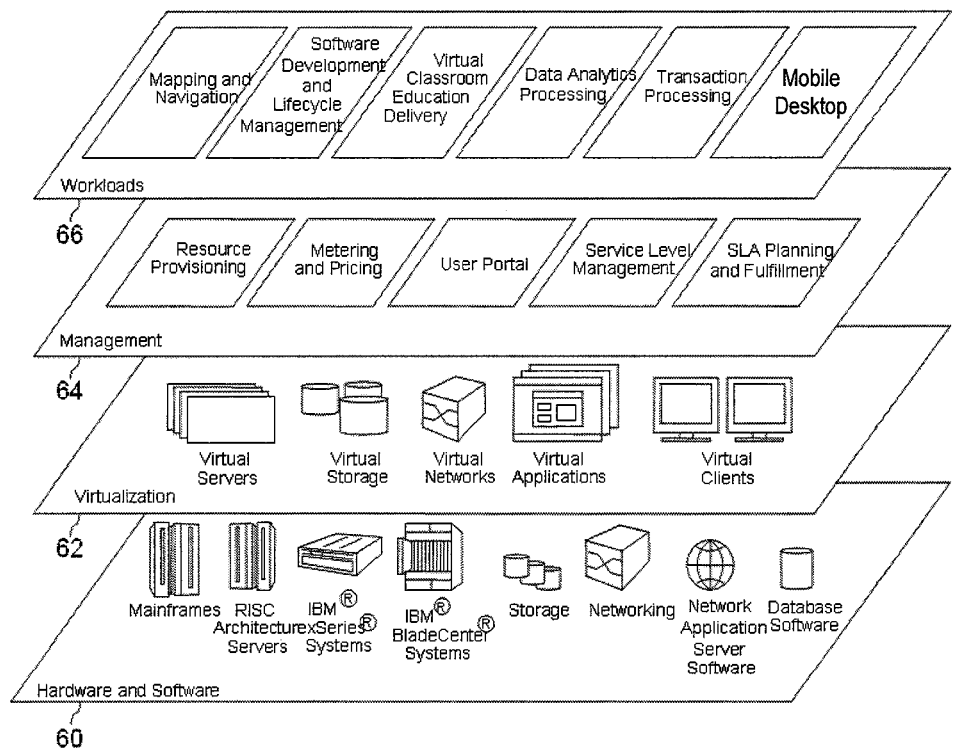
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As illustrated in FIG. 3, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions that may be provided from this layer include: mapping and navigation; software development and lifecycle management; virtual classroom education delivery; data analytics processing; transaction processing; and Mobile Desktop.

Figure 4:
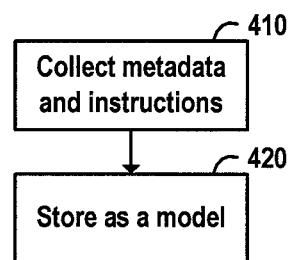
FIG. 4 illustrates a schematic flowchart of a method for deploying an application in a cloud computing environment according to an embodiment of the present invention.

With reference now to FIG. 4, this figure shows a method for deploying an application in a cloud computing environment provided by one embodiment of the present invention. The method comprises: in step 410, collecting, when a user is deploying an application, metadata and instructions on deploying the application, the metadata comprising service metadata, application metadata and topology metadata, wherein the service metadata comprise metadata on a service required for deploying the application, the application metadata comprise metadata on the application, and the topology metadata comprise metadata indicative of a relationship between the service and the application; in step 420, storing the collected metadata and instructions as a model for re-deploying the application. According to the method provided by this embodiment, while a user deploys an application for the first time, the user's deployment operations are recorded as a model by collecting and recording metadata and instructions. If wanting to re-deploy the application, the user can automatically deploy the application by invoking the model, without performing manual deployment operations again, thereby saving a lot of work for the user. For a user without specialized skills of deploying applications, specialists may deploy applications once; by means of the method provided by this embodiment, the specialists' deployment operations are recorded to form deployment models of these applications, and the user without specialized skills simply needs to select a corresponding deployment model or an application desired to be deployed, thereby automatically deploying the application. This makes it convenient for usage and lowers requirements on the user skills.

In one embodiment of the present invention, the service metadata comprise one or a combination of: a type of the service, a name of the service, an ID of the service, a version of the service and configuration of the service. The application metadata comprise one or a combination of: a type of the application, a name of the application, an ID of the application and configuration of the application. The topology metadata comprise one or a combination of: an ID of the application, an ID of the service, a name of the application, a name of the service, binding configuration and binding policy. In one embodiment of the present invention, configuration of the service comprises, for example, at least one of resource configuration and service policy configuration. In one embodiment of the present invention, configuration of the application comprises, for example, at least one of resource configuration and application policy configuration. For example, while deploying an application, a user issues following instructions:

Instruction 1: create webapp-name MyApp-file mypackage.war-config myapp.conf

Instruction 2: create service-name My Service-service DB2-version 9.0

Instruction 3: bind-app MyApp-service MyService

Herein, application metadata comprise: name MyApp of the application, code file package mypackage.war of the application, and configuration myapp.conf of the application. Service metadata comprise: name MyService of the service, type DB2, and version 9.0. Topology metadata comprise: name MyApp of the application and name MyService of the service, indicating MyService is to be bound to MyApp.

In one embodiment of the present invention, the instructions on deploying the application comprise, for example, at least one of: creating a running environment of the application; pushing the application to the running environment; creating the service; looking up the service in a service catalog; deleting the service; starting the application; stopping the application; starting the service; stopping the service; building binding between the application and the service; unbinding the application with the service; revising configuration information of the application; revising configuration information of the service; deleting the application.

In one embodiment of the present invention, step 420 may store the collected metadata and instructions in a file or as data records; the present invention is not limited in this regard.

In one embodiment of the present invention, step 420 for example comprises storing, according to an operational order in which the user deploys the application, the collected metadata and instructions to form a model for re-deploying the application. Those skilled in the art may understand in step 410 the collecting metadata and instructions may be implemented concurrently with the user's deployment operations, i.e. the metadata and instructions are collected according to an operational order in which the user deploys the application, so the collected metadata and instructions are directly stored. Or since the collected metadata and instructions might be invalid or redundant, an order of the collected metadata and instructions is adjusted before being stored, the storage following the operational order in which the user deploys the application. While deploying an application, some services need to be bound to the application in order, so by storing the collected metadata and instructions in order to form a model, services can be bound to the application during re-deployment, thereby avoiding errors or conflicts during deployment and increasing the success rate of automatic deployment.

In one embodiment of the present invention, step 420 may comprise, for example, removing redundancy from the collected metadata and instructions. The collected metadata and instructions may contain partial redundancy, such as invalid metadata and instructions, or duplicated metadata and instructions. For example, while deploying an application, the user might issue the instructions for pushing the application several times; since only the instruction issued for the last time is a valid instruction, only the last push instruction and metadata on the instruction such as the number of instances and QoS index are saved, while other push instructions and relevant metadata are removed. Those skilled in the art may understand the removing redundancy from the collected metadata and instructions may be implemented while metadata and instructions are being collected, or implemented after all metadata and instructions are collected. Thus, step 420 for example may comprise one of: analyzing the collected metadata and instructions, removing redundant metadata and instructions, storing, according to an operational order in which the user deploys the application, metadata and instructions from which redundancy has been removed to form a model for re-deploying the application; storing the collected metadata and instructions according to an operational order in which the user deploys the application, analyzing the stored metadata and instructions, removing redundant metadata and instructions to form a model for re-deploying the application. In this embodiment, the analyzing the collected metadata and instructions may be, for example, semantic analysis or processing according to predefined rules. Those skilled in the art may understand other techniques may be adopted for analysis, and the present invention is not limited in this regard.

In one embodiment of the present invention, step 420 may further comprise, for example, combining invalid operation instructions. While the user deploys an application, invalid operations might exist, which results in invalidation of a part of the collected metadata and instructions. For example, while the user deploys application A, he/she creates service B and binds service B to application A. Later, the user finds service C is more suitable than service B, and thus unbinds service B and binds service C to application A. At this point, instructions as creating, deleting and binding service B are invalid instructions, and metadata on these instructions are invalid metadata. The method provided by this embodiment can combine invalid metadata and instructions, thereby further optimizing subsequent automatic deployment. Those skilled in the art may understand the combination may be conducted concurrently with the collection, or the combination is conducted after all metadata and instructions are collected. Thus, step 420 for example may comprise one of: analyzing the collected metadata and instructions, combining invalid metadata and instructions, storing, according to an operational order in which the user deploys the application, the combined metadata and instructions to form a model for re-deploying the application; and storing the collected metadata and instructions according to an operational order in which the user deploys the application, analyzing the stored metadata and instructions, combining invalid metadata and instructions to form a model for re-deploying the application. In this embodiment, the analyzing the collected metadata and instructions may be, for example, semantic analysis or processing according to predefined rules. Those skilled in the art may understand other techniques may be adopted for analysis, and the present invention is not limited in this regard.

In one embodiment of the present invention, step 420 may comprise, for example, combining invalid metadata/instructions and removing redundant metadata/instructions. Concrete approaches may refer to the above embodiment. In this embodiment, if a method for combining metadata and instructions or removing metadata and instructions exists, the method is applicable to the same or different objects.

In one embodiment of the present invention, the method for combining and removing invalid and redundant metadata and instructions comprises, for example: in response to there being multiple push instructions, retaining the last push instruction and relevant metadata only; in response to there being a delete instruction with respect to a certain service, removing all delete instructions with respect to the service and relevant metadata, and all create instructions with respect to the service and relevant metadata before the last delete instruction with respect to the service; in response to there being a stop instruction with respect to a certain application, removing all stop instructions with respect to the application and relevant metadata, and all start instructions with respect to the application and relevant metadata before the last stop instruction with respect to the application; in response to there being a stop instruction with respect to a certain service, removing all stop instructions with respect to the service and relevant metadata, and all start instructions with respect to the service and relevant metadata before the last stop instruction with respect to the service; in response to there being an unbinding instruction with respect to binding between a certain application and a certain service, removing all unbinding instructions with respect to the binding and relevant metadata, and all binding instructions with respect to the binding and relevant metadata before the last unbinding instruction. Those skilled in the art may understand other methods for combining invalid instructions/metadata or removing redundant instructions/metadata may be obtained according to the above example, which is not detailed here.

In one embodiment of the present invention, the method as shown in FIG. 4 further comprises: in response to the user applying to the application which has been deployed a further operation related to the deploying, collecting the metadata and instructions involved in the operation and updating to the model the metadata and instructions involved in the operation, wherein the metadata involved in the operation comprise at least one of service metadata involved in the operation, application metadata involved in the operation and topology metadata involved in the operation. Using the method provided by this embodiment, if the user revises an application that has been deployed, the stored model may be revised by recording the user's operation, so that the revised application can be directly deployed in later re-deployment. Further, using the method provided by this embodiment, multiple versions of the model may be saved to correspond to applications before revision and after each revision respectively, thereby making it convenient for the user to select a proper version among different versions of the application for deployment. In one embodiment of the present invention, the updating to the model the metadata and instructions involved in the operation comprises, for example: at least one of redundancy removing and invalid combining with respect to the collected metadata and instructions involved in the operation and the stored metadata and instructions in the model, and then storing the processed metadata and instructions as a model for re-deploying the application.

As shown in FIG. 5, one embodiment of the present invention provides a method for deploying an application in a cloud computing environment. The method comprises: acquiring a model in step 510, the model being a model that has been obtained according to or in conjunction with the above method embodiments; preparing services used for deploying the application according to service metadata in the model in step 520; pushing the application to a running environment according to application metadata in the model in step 530; and binding the prepared services to the application according to topology metadata in the model in step 540. According to the method provided by this embodiment, it is possible to realize automatic application deployment in the cloud computing environment, thereby facilitating usage and reducing requirements on users' specialized skills. Those skilled in the art may understand in this embodiment, with respect to multiple services, first all services may get prepared, then bind the prepared services to the application, or bind each service to the application once the service gets prepared, or prepare and bind services in other order. In this and following embodiments, the method shown in FIG. 5 may further comprise: starting the service, starting the application, stopping the service, stopping the application, deleting the service, and deleting the application, which is not detailed here.

In one embodiment of the present invention, step 520 for example comprises: preparing services used for deploying the application according to instructions and service metadata in the model and in an order of instructions in the model. Step 540 for example comprises: binding the prepared services to the application according to instructions and topology metadata in the model and in an order of instructions in the model. According to the embodiment shown in FIG. 4, instructions and metadata in the model are stored according to an operational order in which the user deploys the application. Therefore, by preparing required services and binding the services to the application in the same order of instructions in the model, it is possible to ensure automatic deployment follows the operational order of the user's deployment, increase the success rate of automatic deployment, and prevent disorder of added services that are dependent on each other.

In one embodiment of the present invention, step 520 for example comprises one or a combination of: with respect to a dedicated service, creating a new dedicated service according to instructions and service metadata in the model; with respect to a shared service, if the shared service already exists, using the existing shared service, if the shared service does not exist, creating a new shared service according to instructions and service metadata in the model; and with respect to an external service reference, creating a new external service reference according to instructions and service metadata in the model.

In one embodiment of the present invention, the method shown in FIG. 5 further comprises: when the system stops, unbinding an application and services in an order reverse to an order in which the services are bound to the application, and stopping corresponding services and application.

Detailed illustration is presented below to the embodiment shown in FIG. 5 by a concrete example. User A is a user without any specialized skills of deployment, while specialist B is a user with specialized skills of deployment. Specialist B deploys application 1 once in advance of A's deployment. According to the embodiment shown in FIG. 4, a model of application 1 can be obtained by recording deployment of application 1 by specialist B. User A selects to deploy application 1 through an interface, at which point according to the embodiment shown in FIG. 5, model a of application 1 is obtained. In model a there are stored: name x1 of application 1, identifier id1 of application 1, instruction N1, instruction N2, name x2 of service 1, version v2 of service 1, instruction N3, name x3 of service 2, version v3 of service 2, instruction N4, and binding configuration p1 in this order. Among them, instruction N1 is to push to a running environment an application with a name of x1 and an identifier of id1; instruction N2 is to create a dedicated service with a name of x2 and a version of v2; instruction N3 is to look up a shared service with a name of x3 and a version of v3 in a service catalog, and to create a service with a name of x3 and a version of v3 in response to the shared service not being found; instruction N4 is to execute binding with a name of p1. In an order of instructions stored in the model, service 1 and service 2 are created, and service and service 2 are bound to application 1, so that application 1 is deployed automatically.

As shown in FIG. 6, one embodiment of the present invention provides a method for deploying a composite application in a cloud computing environment. The composite application comprises at least two sub-applications, i.e. a first sub-application and a second sub-application. The method comprises: in step 610 acquiring a model of the first sub-application obtained according to the foregoing method embodiments or a combination thereof; in step 620, acquiring a model of the second sub-application obtained according to the foregoing method embodiments or a combination thereof; in step 630, generating lifecycle management information of the composite application according to topology metadata in the model of the first sub-application and topology metadata in the model of the second sub-application; and in step 640, storing the model of the first sub-application, the model of the second sub-application and the lifecycle management information of the composite application as a model of the composite application for deployment of the composite application. In this embodiment, there is no specific execution order between step 610 and step 620. In one embodiment of the present invention, the lifecycle management information of the composite application comprises, for example, at least one of: the first sub-application, the second sub-application, creating, starting, stopping, updating and deleting services required by the first sub-application and the second sub-application. By means of the method provided by the embodiment as shown in FIG. 6, a model of the composite application can be obtained, thereby making it convenient for the user to deploy the composite application. Moreover, if the model of the first sub-application or the second sub-application already exists, using the method provided by this embodiment, a stored model can be obtained directly, and a model of the composite application can be obtained by generating lifecycle management information of the composite application, thereby simplifying deployment of the composite application having multiple sub-application modules and making full use of existing resources. For example, application W comprises two sub-applications, i.e. sub-application x for querying account information and sub-application y for managing account information. Since the user has already deployed sub-application x, there exists a model of sub-application x. Now only by deploying sub-application y once, a model of sub-application y can be obtained. Thus, by acquiring models of sub-applications x and y and generating lifecycle management information of application W, models of x and y and the lifecycle management information of application W can be stored to form a model of application W. When application W needs to be deployed, automatic deployment can be realized according to its model. By forming a model of a composite application in a modular fashion, the users are facilitated in deploying a large scale composite application comprising multiple sub-applications. Further, by forming a model of a composite application in a modular fashion, existing models of sub-applications can be re-used, and human resources for re-generating the sub-applications can be reduced.

More embodiments can be obtained by referring to and combining the foregoing embodiments of the present invention, which is not detailed here.

One embodiment of the present invention provides a system for deploying an application in a cloud computing environment, the system capable of executing the foregoing method embodiments. With reference to FIGS. 7 to 10, detailed illustration is presented below to various implementations of the system.

As shown in FIG. 7, one embodiment of the present invention provides a system 700 for deploying an application in a cloud computing environment. System 700 comprises: a collecting module 710 configured to collect, when a user is deploying an application, metadata and instructions on deploying the application; a storing module 720 configured to store the collected metadata and instructions as a model for re-deploying the application. In this embodiment, the metadata comprise service metadata, application metadata and topology metadata, wherein the service metadata comprise metadata on a service required for deploying the application, the application metadata comprise metadata on the application, and the topology metadata comprise metadata indicative of a relationship between the service and the application. Specifically, as for descriptions and examples of the service metadata, the application metadata and the topology metadata, please refer to the method embodiment and are not detailed here. With system 700 provided by this embodiment, it is possible to help non-specialists to realize automatic application deployment, thereby reducing requirements on specialized skills of application deployment and saving resources consumed by duplicated deployment.

In one embodiment of the present invention, storing module 720 is further configured to store, according to an operational order in which the user deploys the application, the collected metadata and instructions to form a model for re-deploying the application.

Figure 8:
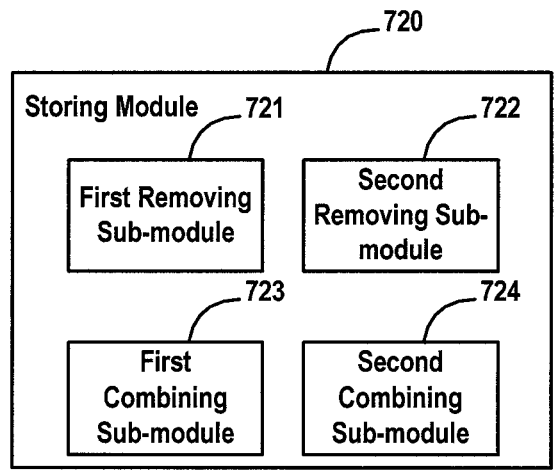
FIG. 8 illustrates a schematic structural diagram of a storing module provided by an embodiment of the present invention.

In one embodiment of the present invention, as shown in FIG. 8, storing module 720 comprises at least one of: a first removing sub-module 721 configured to analyze the collected metadata and instructions, remove redundant metadata and instructions, and store, according to an operational order in which the user deploys the application, the redundancy-removed metadata and instructions to form a model for re-deploying the application; a second removing sub-module 722 configured to store the collected metadata and instructions according to an operational order in which the user deploys the application, analyze the stored metadata and instructions, and form from redundancy-removed metadata and instructions a model for re-deploying the application; a first combining sub-module 723 configured to analyze the collected metadata and instructions, combine invalid metadata and instructions, and store, according to an operational order in which the user deploys the application, the combined metadata and instructions to form a model for re-deploying the application; a second combining sub-module 724 configured to store the collected metadata and instructions according to an operational order in which the user deploys the application, analyze the stored metadata and instructions, and combine invalid metadata and instructions to form a model for re-deploying the application. Those skilled in the art may understand where all these sub-modules exist, only part or all of the sub-modules may be started. Where all of the sub-modules are started, each of them may process the same or different objects.

In one embodiment of the present invention, the embodiment shown in FIG. 7 may further comprise an updating module configured to: in response to the user applying to the application which has been deployed a further operation related to the deploying, collect the metadata and instructions involved in the operation and update to the model the metadata and instructions involved in the operation, wherein the metadata involved in the operation comprise at least one of service metadata involved in the operation, application metadata involved in the operation and topology metadata involved in the operation.

Figure 9:
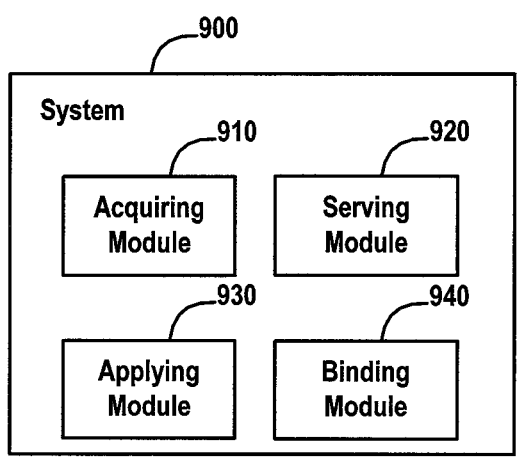
FIG. 9 illustrates a schematic structural diagram of a system for deploying an application in a cloud computing environment according to an embodiment of the present invention.

As shown in FIG. 9, one embodiment of the present invention provides a system 900 for deploying an application in a cloud computing environment. System 900 comprises: an acquiring module 910 configured to acquire a model, the model being a model that has been obtained according to the foregoing method embodiments or by the foregoing apparatus embodiments; a serving module 920 configured to prepare services used for deploying the application according to instructions and service metadata in the model; an applying module 930 configured to push the application to a running environment according to application metadata in the model; and a binding module 940 configured to bind the prepared services to the application according to instructions and topology metadata in the model. In this embodiment, work cooperation between serving module 920 and binding module 930 may be once serving module 920 prepares one service, binding module 940 binds the service, or after serving module 920 prepares multiple services, binding module 940 binds the multiple services to the application. With system 900 provided by the embodiment, it is possible to realize automatic application deployment, thereby avoiding manpower consumption of duplicated deployment and reducing requirements on skills of application deployment.

In one embodiment of the present invention, binding module 940 is further configured to: bind the prepared services to the application according to instructions and topology metadata in the model and in an order of the instructions in the model.

In one embodiment of the present invention, serving module 920 is further configured to: prepare services used for deploying the application according to instructions and service metadata in the model and in an order of the instructions in the model.

In one embodiment of the present invention, serving module 920 comprises one or a combination of: a dedicated sub-module configured to, with respect to a dedicated service, create a new dedicated service according to instructions and service metadata in the model; a shared sub-module configured to, with respect to a shared service, if the shared service already exists, use the existing shared service, if the shared service does not exist, create a new shared service according to instructions and service metadata in the model; and an external sub-module configured to, with respect to an external service reference, create a new external service reference according to instructions and service metadata in the model.

Figure 10:
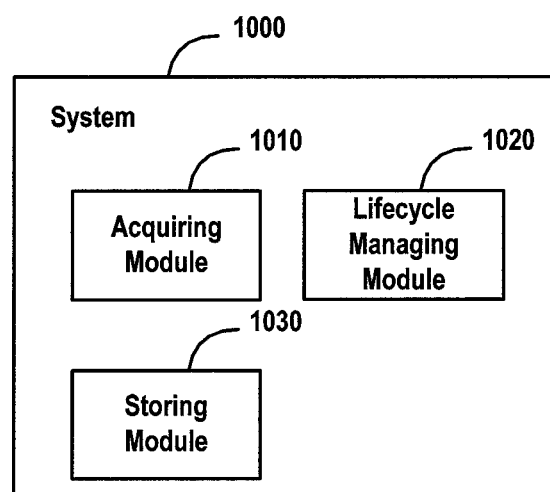
FIG. 10 illustrates a schematic structural diagram of a system for deploying an application in a cloud computing environment according to an embodiment of the present invention.

As shown in FIG. 10, one embodiment of the present invention provides a system 1000 for deploying a composite application in a cloud computing environment. The composite application at least comprises a first sub-application and a second sub-application. System 1000 comprises: an acquiring module 1010 configured to acquire models of the first sub-application and the second sub-application, wherein the modules of the first sub-application and the second sub-application are obtained according to the foregoing method embodiments or apparatus embodiments; a lifecycle managing module 1020 configured to generate lifecycle management information of the composite application according to topology metadata in the model of the first sub-application and topology metadata in the model of the second sub-application; and a storing module 1030 configured to store the model of the first sub-application, the model of the second sub-application and the lifecycle management information of the composite application as a model of the composite application for deploying the composite application. With system 1000 provided by this embodiment, a user can reuse existing models of sub-applications and thus acquire a model of a composite application, thereby deploying the composite application, avoiding duplicated work for deploying the composite application and reducing requirements on skills of deploying the composite application.

Implementation details of the foregoing apparatus embodiments may refer to the corresponding method embodiments. Moreover, the foregoing apparatus embodiments may make reference to one another to obtain more examples.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for deploying an application in a cloud computing environment, the method comprising:
    collecting, when a user is deploying the application, metadata and instructions on deploying the application, the metadata comprising service metadata, application metadata and topology metadata, wherein the service metadata comprises metadata on a service required for deploying the application, the application metadata comprises metadata on the application, and the topology metadata comprises metadata indicative of a relationship between the service and the application;
    analyzing the collected metadata and instructions to remove redundant metadata and instructions by, in response to there being a plurality of push instructions included in the instructions, retaining a last push instruction and metadata on the last push instruction and removing other push instructions and metadata on the other push instructions; and
    storing, according to an operational order in which the user deploys the application, the collected metadata and instructions as a model for re-deploying the application.

2. The method according to claim 1, wherein removing the redundant metadata and the instructions further comprises, in response to there being a stop instruction with respect to a certain application, removing all stop instructions with respect to the certain application and relevant metadata, and removing all start instructions with respect to the certain application and relevant metadata before a last stop instruction with respect to the certain application.

3. The method according to claim 1, wherein removing the redundant metadata and the instructions further comprises, in response to there being a stop instruction with respect to a certain service, removing all stop instructions with respect to the service and relevant metadata, and removing all start instructions with respect to the service and relevant metadata before a last stop instruction with respect to the service.

4. The method according to claim 1, wherein removing the redundant metadata and the instructions further comprises, in response to there being an unbinding instruction with respect to a binding between a certain application and a certain service, removing all unbinding instructions with respect to the binding and relevant metadata, and removing all binding instructions with respect to the binding and relevant metadata before a last unbinding instruction.

5. The method according to claim 1, wherein:
    service metadata comprising one or a combination of: a type of the service, a name of the service, an ID of the service, a version of the service and a configuration of the service;
    application metadata comprising one or a combination of: a type of the application, a name of the application, an ID of the application and a configuration of the application; and
    topology metadata comprising one or a combination of: an ID of the application, an ID of the service, a name of the application, a name of the service, a binding configuration and a binding policy.

6. The method according to claim 1, further comprising, in response to the user applying to the application which has been deployed a further operation related to the deploying, collecting metadata and instructions involved in the further operation and updating to the model the metadata and instructions involved in the further operation, wherein the metadata involved in the further operation comprise at least one of service metadata involved in the further operation, application metadata involved in the further operation and topology metadata involved in the further operation.

7. A system for deploying an application in a cloud computing environment, the system comprising:
    a first circuitry to collect, when a user is deploying the application, metadata and instructions on deploying the application, the metadata comprising service metadata, application metadata and topology metadata, wherein the service metadata comprises metadata on a service required for deploying the application, the application metadata comprises metadata on the application, and the topology metadata comprises metadata indicative of a relationship between the service and the application; and
    a second circuitry to:
        analyze the collected metadata and instructions to remove redundant metadata and instructions by, in response to there being a plurality of push instructions included in the instructions, retaining a last push instruction and metadata on the last push instruction and removing other push instructions and metadata on the other push instructions; and store, according to an operational order in which the user deploys the application, the collected metadata and instructions as a model for re-deploying the application.

8. The system according to claim 7, wherein the second circuitry further removes the redundant metadata and the instructions by, in response to there being a stop instruction with respect to a certain application, removing all stop instructions with respect to the certain application and the relevant metadata, and removing all start instructions with respect to the certain application and relevant metadata before a last stop instruction with respect to the certain application.

9. The system according to claim 7, wherein the second circuitry further removes the redundant metadata and the instructions by, in response to there being a stop instruction with respect to a certain service, removing all stop instructions with respect to the certain service and relevant metadata, and removing all start instructions with respect to the service and relevant metadata before a last stop instruction with respect to the service.

10. The system according to claim 7, wherein the second circuitry further removes the redundant metadata and the instructions by, in response to there being an unbinding instruction with respect to a binding between a certain application and a certain service, removing all unbinding instructions with respect to the binding and relevant metadata, and removing all binding instructions with respect to the binding and relevant metadata before a last unbinding instruction.

11. The system according to claim 7, wherein:
service metadata comprising one or a combination of: a type of the service, a name of the service, an ID of the service, a version of the service and a configuration of the service;
application metadata comprising one or a combination of: a type of the application, a name of the application, an ID of the application and a configuration of the application; and
topology metadata comprising one or a combination of: an ID of the application, an ID of the service, a name of the application, a name of the service, a binding configuration and a binding policy.

12. The system according to claim 7, wherein:
the first circuitry is operable to, in response to the user applying to the application which has been deployed a further operation related to the deploying, collect metadata and instructions involved in the further operation; and
the second circuitry is operable to update the model with the metadata and instructions involved in the further operation, wherein the metadata involved in the further operation comprise at least one of service metadata involved in the further operation, application metadata involved in the further operation and topology metadata involved in the further operation.

13. A computer program product for deploying an application in a cloud computing environment, the computer program product comprising:
a non-transitory computer readable medium having computer readable program code embodied therewith, the computer readable program code comprising computer readable program code configured to:

collect, when a user is deploying the application, metadata and instructions on deploying the application, the metadata comprising service metadata, application metadata and topology metadata, wherein the service metadata comprises metadata on a service required for deploying the application, the application metadata comprises metadata on the application, and the topology metadata comprises metadata indicative of a relationship between the service and the application;
analyze the collected metadata and instructions to remove redundant metadata and instructions by, in response to there being a plurality of push instructions included in the instructions, retaining a last push instruction and metadata on the last push instruction and removing other push instructions and metadata on the other push instructions; and
store, according to an operational order in which the user deploys the application, the collected metadata and instructions as a model for re-deploying the application.

14. The computer program product of claim 13, wherein the computer readable program code is configured to further remove the redundant metadata and the instructions by, in response to there being a stop instruction with respect to a certain application, removing all stop instructions with respect to the certain application and relevant metadata, and removing all start instructions with respect to the certain application and the relevant metadata before a last stop instruction with respect to the certain application.

15. The computer program product of claim 13, wherein the computer readable program code is configured to further remove the redundant metadata and the instructions by, in response to there being a stop instruction with respect to a certain service, removing all stop instructions with respect to the service and relevant metadata, and removing all start instructions with respect to the certain service and relevant metadata before a last stop instruction with respect to the service.

16. The computer program product of claim 13, wherein:
service metadata comprising one or a combination of: a type of the service, a name of the service, an ID of the service, a version of the service and a configuration of the service;
application metadata comprising one or a combination of: a type of the application, a name of the application, an ID of the application and a configuration of the application; and
topology metadata comprising one or a combination of: an ID of the application, an ID of the service, a name of the application, a name of the service, a binding configuration and a binding policy.

17. The computer program product of claim 13, wherein the computer readable program code is configured to:
in response to the user applying to the application which has been deployed a further operation related to the deploying, collect metadata and instructions involved in the further operation; and
update the model with the metadata and the instructions involved in the further operation, wherein the metadata involved in the further operation comprise at least one of service metadata involved in the further operation, application metadata involved in the further operation and topology metadata involved in the further operation.

* * * * *